April 16, 1957  P. EISLER ET AL  2,789,259
VARIABLE CAPACITORS
Filed Jan. 29, 1953  3 Sheets-Sheet 3
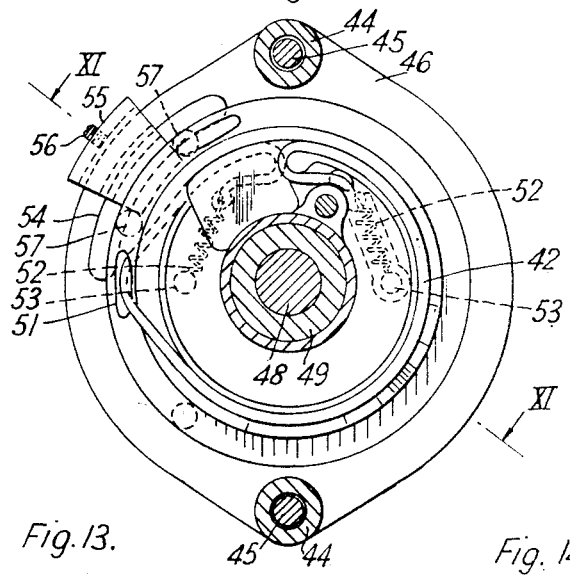
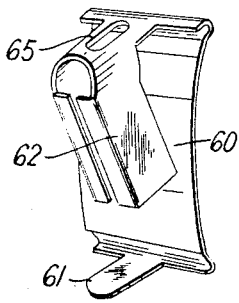
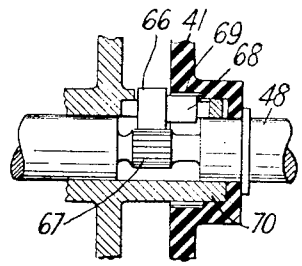
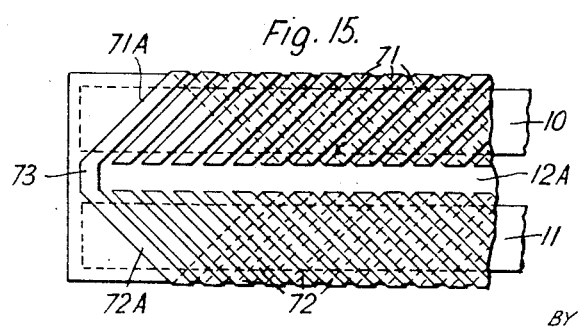
INVENTORS
P. EISLER
E. HAUSER
BY
ATTORNEY

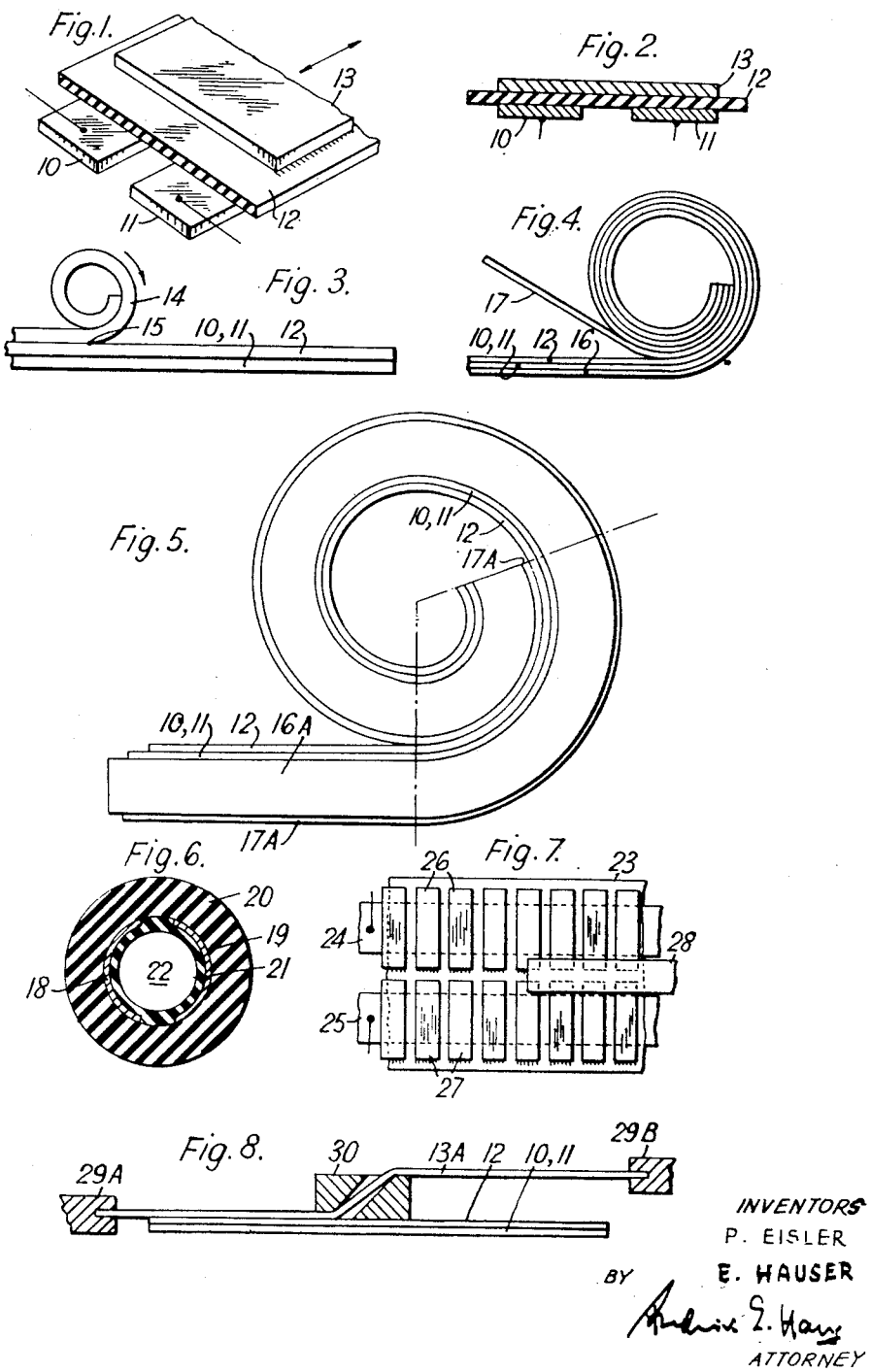

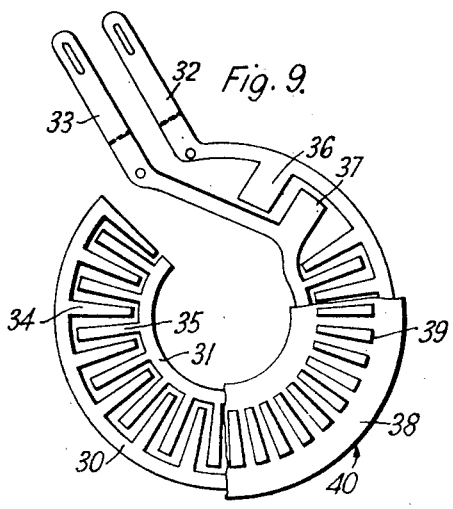
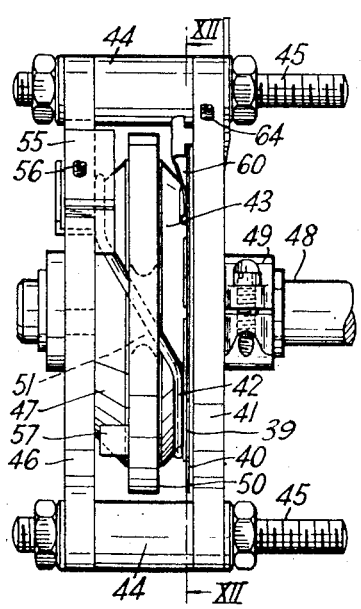
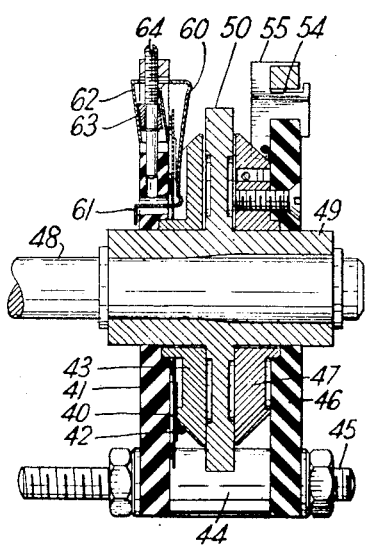

United States Patent Office 2,789,259
Patented Apr. 16, 1957

2,789,259

VARIABLE CAPACITORS

Paul Eisler and Erwin Hauser, London, England, assignors to Technograph Printed Circuits Limited, London, England, a company of Great Britain Application January 29, 1953, Serial No. 333,902

Claims priority, application Great Britain February 1, 1952

9 Claims. (Cl. 317—249)

This invention relates to electric capacitors the capacity of which can be varied.

In its broadest aspect a variable capacitor according to the present invention comprises two electrodes spaced apart on the same side of a dielectric layer, an electrically isolated conductive bridge at least a part of which is disposed on the opposite side of the dielectric layer so as to overlap both electrodes, and means for varying the effective area of this overlap so as to vary the capacity.

The dielectric is preferably a solid, so that a wide choice of materials of different dielectric properties is available, in contrast to the case where the dielectric is air, as in many variable capacitors. Also, for a given potential difference between the electrodes a much thinner layer of dielectric can be employed without risk of breakdown, so that for a given capacity and range of variation a capacitor embodying the invention can be made smaller than hitherto has been commercially practicable with air dielectric instruments.

Another feature of the invention is that the capacitors can be made from thin flexible materials, and they can be manufactured cheaply by printed circuit technique. Any reasonable capacity-motion relationship can therefore easily be achieved.

Variable capacitors embodying the invention can be used for practically all purposes for which variable capacitors of known construction can be employed, but in addition they have applications for which known variable capacitors are not suitable.

An essential feature of the invention is the variation in the effective area of overlap of the conductive bridge over the electrodes. There are several possible ways of achieving this variation, depending upon the physical nature of the electrodes, the dielectric and the conductive bridge, but preferably the variation is achieved by a relative movement between parts of the capacitor which does not alter the relative positions of the electrodes. Thus both electrodes can be kept stationary, enabling fixed connections to the electrodes to be employed.

In one form of the invention the variation in the effective area of overlap is achieved by a relative sliding movement between parts of the capacitor, for instance by sliding the conductive bridge over the surface of the dielectric so that it overlaps greater or smaller areas of the electrodes.

In another form of the invention the variation in the effective area of overlap is achieved by a relative bringing together or drawing apart of parts of the capacitor. One way of doing this is to make the conductive bridge in the form of a flexible band which is wound into a roll, and to vary the area of overlap by laying down a variable length of the band over the surface of the dielectric by unrolling the band to the desired extent, somewhat after the manner employed in laying a roll of carpet. Alternatively the electrodes, the dielectric and the conductive bridge may be in the form of a flexible band or bands and the effective area of overlap may be increased by winding the band or band into a spiral coil so as to bring adjacent turns into close contact with each other, while the effective area may be reduced by unwinding the coil. Where the electrodes, the dielectric and the conductive bridge constitute a flexible composite band, an insulating layer is provided for separating the electrodes in one turn from the conductive bridge in the adjacent turn when the band is wound into a spiral coil. In another form of the invention in which the area of overlap is varied by a relative bringing together or drawing apart of parts of the capacitor, the electrodes, the dielectric and at least a part of the conductive bridge constitute two separate elements one of which is flexible and cooperates with a movable member adapted, when moved in one direction, progressively to bring the said flexible element into engagement with the other element to increase the effective area of overlap, and, when moved in the opposite direction, progressively to draw the said flexible element away from the other element to reduce the effective area of overlap. In certain cases both elements may be flexible. The arrangement is preferably such that the movements of the movable member do not change the overall length of the flexible element with which this member co-operates. In such forms of the invention parts of the capacitor may exert a wedging action on the portion of the said flexible element which is in engagement with the other element, to provide a firm contact pressure between these elements.

In its simplest form the conductive bridge comprises a single band of conductive material, e. g. metal foil of metallised paper, which is wide enough to span both electrodes. In this case, however, the band cannot remain fixed permanently in contact with the surface of the dielectric if capacity variation is to be achieved, and there is a risk of some instability owing to minute changes in the distance between the conductive band and the electrodes, or the inclusion of foreign particles between the band and the dielectric. This risk is avoided in one form of the invention where the conductive bridge comprises two arrays of spaced strips, each array being arranged opposite to a different electrode, and means for connecting together varying numbers of strips from each array.

Conveniently the two electrodes have projecting fingers which lie between but are spaced from the fingers projecting from the other electrode, and the arrays of strips of the conductive bridge comprise alternate members of a row of strips superimposed on the dielectric opposite to the said electrode fingers. In such arrangements in which the conductive bridge includes arrays of strips the variation in the capacity can be produced by a movable member of the kind referred to earlier, which in this case is arranged to lay a flexible conductor over the surface of the strips to complete the conductive bridge. In this case the relative movement which produces the variation in the capacity affects only a switching member which connects and disconnects parts of the conductive bridge.

In another form of the invention employing arrays of strips as part of the conductive bridge, the electrodes and the dielectric are in the form of a flexible band, there is dielectric on both sides of the electrodes, and the strips of each array have portions on both surfaces of the dielectric these portions being oblique to the length of the band such that when the band is wound into a spiral coil the portions on the front of the dielectric in one turn cross and make contact with the portions from the same array on the back of the dielectric in the adjacent turn so that all the strips of each array in the coil are connected together, and at least one bridging connection is provided between the two arrays in the coil.

The conductive bridge need not necessarily be a solid, because in one form of the invention the conductive bridge (or the part thereof which serves for varying the area of overlap) consists of a conductive liquid such as mercury, and means is provided for causing relative movement between a surface of this liquid and the dielectric, or between a surface of the liquid and contacts associated with conductive areas on the dielectric to complete the conductive bridge.

The invention may be performed in numerous ways and certain specific embodiments will be described by way of example with reference to the accompanying drawings, in which:

Figure 1 is a diagrammatic perspective view of a simple form of the invention;

Figure 2 is a cross-section of the embodiment shown in Figure 1;

Figure 3 is a side elevation of a form of the invention in which the capacity is varied by a rolling-on action;

Figure 4 is a side elevation of a form of the invention in which the capacity is varied by a winding action;

Figure 5 is a side elevation of another form of the invention in which the capacity is varied by a winding action;

Figure 6 is a cross-section through a particular form of the invention in which the capacity value is dependent upon a variable, such as temperature;

Figure 7 is a diagrammatic plan view of a further form of the invention which has especially good stability;

Figure 8 is a diagrammatic side elevation of a form of the invention in which the capacity is varied by movement of a movable member;

Figure 9 is a view of the electrode and dielectric assembly of a variable capacitor instrument embodying the invention;

Figure 10 is a side elevation of the complete instrument embodying the parts shown in Figure 9;

Figure 11 is a sectional elevation of the instrument shown in Figure 10 taken on the line XI—XI in Figure 12;

Figure 12 is a cross-section taken on the line XII—XII in Figure 10;

Figure 13 is a detailed perspective view of the trimming device of the instrument shown in Figures 9 to 12;

Figure 14 shows a modification of the instrument of Figures 9 to 13, providing more sensitive control; and Figure 15 shows a further form of the invention in which the capacity is varied by a winding action.

In its broadest aspect, as illustrated diagrammatically in Figures 1 and 2, the capacitor consists of two electrodes 10 and 11 spaced apart on the same side of a dielectric layer, preferably on the same side of a sheet or strip of solid dielectric material 12. Against the opposite side of the dielectric layer is laid a sheet or strip of conductive material 13 which overlaps and bridges both the electrodes 10 and 11. The conductive bridge 13 is arranged so that it can be moved relatively to the dielectric layer in order to vary the area of overlap and hence vary the capacity.

The electrostatic lines of force from the overlapped area of the electrode 10 will pass through the dielectric layer 12 to the conductive bridge 13, and corresponding lines of force will pass from the bridge 13 through the dielectric layer 12 to the overlapped area of the other electrode 11. The capacitor is therefore electrically equivalent to a capacitor in which electrodes of the same size as the overlapped areas of the electrodes 10 and 11 are arranged opposite to one another on opposite sides of a dielectric of twice the thickness of the dielectric layer 12. Looked at in another way, the capacitor can be regarded as electrically equivalent to two capacitor units connected in series.

In the case where the electrodes 10 and 11 and the dielectric layer 12 form one rigid element and the conductive bridge 13 forms another rigid element, the area of overlap can be varied by sliding one of the elements over the surface of the other element in the direction of the double-headed arrow in Figure 1 so that the conductive bridge overlaps greater or lesser areas of the electrodes. The sliding need not necessarily be linear since other forms of sliding may be employed, depending upon the shape of the elements. For instance, a rotary sliding movement may be employed if the elements be curved.

If the electrodes 10 and 11 be of uniform width there will generally be a linear relationship between the capacity of the capacitor and the movement of the conductive bridge 13. By varying the shape of the electrodes, or of the conductive bridge, or both, this relationship can be made non-linear and can be arranged to follow any desired law. By virtue of the fact that printed circuit techniques can be used for the manufacture of the capacitors, as described below, a very wide variety of shapes of electrodes can be achieved easily and at low cost. The shapes of the electrodes can be adjusted subsequently to manufacture by the employment of known metallising or de-metallising techniques for adding to or removing areas of the electrodes where required. This feature is of particular value where the tuning characteristics of a finished capacitor have to be adjusted, for instance for "aligning" tuned circuits in radio apparatus or other electronic equipment.

Where the area of overlap is varied by a sliding movement it may sometimes be difficult to ensure that the distance between the conductive bridge 13 and the electrodes 10 and 11 is accurately maintained. Also, the surface of the dielectric may suffer abrasion, and there is a risk of dirt or other inclusions getting trapped between the conductive bridge 13 and the dielectric 12.

Another possibility for varying the area of overlap which is less subject to these disadvantages is to make one of the elements flexible and to vary the area of overlap by laying the flexible element on to, or peeling it off, the adjacent surface of the other element. The laying on may be accomplished by unrolling the flexible element from a roll, while the peeling off may be accomplished by rolling it back on to the roll.

Such an arrangement is shown in Figure 3 where the electrodes 10, 11 and the dielectric 12 form a rigid element while the conductive bridge 14 is made of flexible material and can be rolled on to the surface of the dielectric 12 in the direction of the arrow. In this case the only effective area of the capacitor electrodes is the area lying to the left of the point 15 where the conductive bridge 14 makes contact with the surface of the dielectric 12.

The conductive bridge 14 may consist of a flexible conductive band such as a band of metal foil or a band of a flexible insulating material having a metallised under surface.

A further possibility, which is shown in Figure 4, is to make both the elements flexible and to vary the area of overlap by winding them together from different directions about a common axis, to form a spiral coil.

In the arrangement shown in Figure 4 the dielectric 12 and the electrodes 10, 11 form a flexible element provided with an insulating backing sheet 16 for protecting the outer surfaces of the electrodes. The conductive bridge element is in the form of a flexible band 17. Provision is made for winding the two elements together from different directions so that the conductive bridge effectively overlaps the electrodes only in the portions of the bands which are wound together.

The bands pass to the winding roll from separate reels, which are loaded as by means of springs to hold the bands taut. Instead of making the insulating band 16 integral with the electrode and dielectric element, it may be in the form of a separate strip drawn from a separate reel.

Another arrangement in which a rolling technique is employed for adjusting the capacity value is shown in Figure 5. In this case there are the two electrodes 10, 11 mounted on one side of a dielectric sheet 12 as in Figure 4, but the insulating backing sheet 16A is made thick compared with the thickness of the electrodes and the dielectric sheet. On the outer surface on the insulating backing sheet 16A is secured the conductive bridge 17A, which in this case is either in the form of a thin metal foil or a metallised layer. Owing to the thickness of the insulating backing sheet 16A, the capacity of the unwound band is negligible, but when it is wound upon itself in a spiral coil the conductive layer 17A in one turn is separated from the electrodes 10, 11 in the adjacent turn only by the thickness of the dielectric sheet 12. Consequently the wound portion, as shown between the chain dotted lines in Figure 5, is effective as a capacitor, the capacity being varied by winding up more or less of the composite band.

It is not essential for the conductive bridge to be a solid, since in some cases it may be a conductive liquid such as mercury, the area of overlap being varied by causing relative movement between the liquid and the surface of the dielectric so as to alter the position of a line of contact between the surface of this liquid and the surface of the dielectric.

One particular embodiment of the latter form of the invention is shown in Figure 6. This may serve as a device for measuring or indicating temperature changes by changes in the capacity of the capacitor. In this embodiment the electrodes comprise stripes of metal 18 and 19 deposited longitudinally on the inner surface of a glass or other insulating tube 20, and the dielectric comprises a lining 21 for the tube such that the electrodes lie between the inner surface of the tube and the outer surface of the lining. A conductive liquid, for instance mercury, is arranged to advance through the bore 22 of the lined tube in accordance with temperature variations, so that the area of the electrodes 18 and 19 overlapped by the conductive liquid varies in accordance with the temperature. Hence, the capacity of the capacitor will vary similarly.

By causing movement of the column of conductive liquid in response to some variable other than temperature such as gas or liquid pressure, or dimensional variation of a solid body under stress or strain for instance by causing variations in the volume of the conductive liquid reservoir in dependence on changes in the said variable, the capacity of the capacitor will afford an indication of the value of this variable.

In a preferred form of the invention, illustrated diagrammatically in Figure 7, on the side of a dielectric sheet 23, remote from the electrodes 24 and 25, are two arrays 26 and 27 of closely spaced conductive strips, the array 26 overlapping the electrode 24 and the array 27 overlapping the electrode 25. A movable contact 28 is provided for connecting together variable numbers of strips from the two arrays 26 and 27 so that the conductive bridge includes the connected strips but not the unconnected strips. In this case the capacity will be varied in a series of steps, but if the strips 26 and 27 are numerous and narrow the steps will be very small. In certain instances the strips 26 and 27 may be dimensioned so that the increments of capacity variation approximately coincide with the limits of tuning accuracy determined by the unavoidable backlash in the mechanical control of the movable part or parts of the capacitor.

Arrangements employing arrays of strips have several advantages. In the first place, the strips can be permanently secured to the dielectric so that the distance between the electrodes and the conductive bridge remains constant, which affords a high degree of stability. Again, there is no possibility of abrasion of the effective portions of the dielectric surface or of the occasional inclusion of foreign particles between the dielectric and the conductive bridge. The connections between the strips 26 and 27 are external to the main electric circuit including the electrodes 24 and 25, so that adjusting the contact should not cause noise or disturbance in the main circuit.

The connections between the strips 26 and 27 need not be made adjacent to the surface of the dielectric as shown in Figure 7, since leads may be taken from the strips to any desired place.

Arrangements of the type where leads are taken from the arrays of strips to external points can have a variety of applications, because, by varying the number of strips connected together, the capacity of the capacitor can be varied and can be used to provide an indication of any variable which can be arranged to influence the number of connections made. For instance, if the leads are taken to a point in which they are arranged in line and the variable is caused to produce movement of a contact along the line, the capacity will depend on this linear movement. Again, if the contacts are arranged in a surface the capacity value will give the measure of any conductive area placed upon the said surface.

This constitutes an improved form of the temperature-sensitive device shown in Figure 6. Some advantages of this improved arrangement are that the capacity value is independent of the size of the insulating tube, while the capacitor and the tube can be located at some distance from one another.

The arrangements described can conveniently be made by a printed circuit technique, for example by sandwiching a layer of dielectric material between two sheets of metal foil and then removing unwanted areas from the metal foils by an etching treatment, having previously protected with an etch-resistant ink the desired patterns of the electrodes and strips.

According to a further feature of the invention as shown diagrammatically in Figure 8 the conductive bridge consists at least partly of a flexible element 13A. There are two anchorages 29A and 29B, one for each end of the flexible element, such that one end is held by the anchorage 29A in contact with the surface of the dielectric 12 (or in contact with arrays of strips thereon), while the other end is held by the anchorage 29B clear of this surface. There is a capacity adjusting member 30 which engages the flexible element and is movable relatively thereto so as to hold an adjustable length of the flexible element 13A in close contact with the said surface but to hold the remainder of the flexible element well clear of this surface.

By moving the capacity adjusting member 30, therefore, the length of the flexible element which is in contact with the said surface can be varied at will, and since this length determines the electrode area that is effectively overlapped by the conductive bridge, the position of the capacity adjusting member determined the capacity value. A special feature of this form of the invention is that the length of the flexible element 13A remains constant irrespective of the position of the capacity adjusting member 30, and the form of the flexible element in the transition region from where it lies in close contact with surface of the dielectric to where it is held clear of this surface also remains constant, irrespective of whereabouts in the length of the flexible element this transition region occurs.

One particular form of capacitor which embodies this aspect of the invention is illustrated in Figures 9 to 13. In this embodiment there is an electrode, dielectric and strip array assembly which is shown in Figure 9. There are two electrodes 30 and 31 each having a terminal portion 32 and 33 respectively. The electrode 30 is formed with a large number of inwardly facing fingers 34 which extend between, and are spaced from, outwardly projecting fingers 35 of the electrode 31. The electrode 30 also carries a broad inwardly projecting tongue 36 which lies adjacent to a broad outwardly projecting tongue 37 of the electrode 31, for a purpose to be described later.

Overlying the electrodes is a thin flat ring of dielectric material 38, of which only a portion is shown in Figure 9 so that the underlying electrode structure is more clearly visible. On the other surface of the dielectric 38 is formed an array of conductive strips 39 each of which completely overlies one of the fingers 34 or 35. If two adjacent strips 39 are connected together, therefore, a bridge will be established between an adjacent pair of fingers 34 and 35 thereby producing a capacity effect. The total capacity effect therefore will depend upon the number of strips 39 which are connected together.

The whole assembly shown in Figure 9 can be made by a printed circuit technique as described above.

The electrode and capacitor assembly of Figure 9, denoted generally by the numeral 40, is mounted on an insulating end plate 41 (Figures 10 and 11) of the instrument. For connecting the strips 39 together a flexible conductive element 42 is provided. This may consist of a thick, very flexible metal wire or, alternatively, of a long length of thin wire wound into a long, tight, flexible coil, or of a flexible braided wire cord. Preferably the flexible conductive element is elastic in the longitudinal direction.

Fixed in relation to the end plate 41 is an annular member 43 having a surface of frusto-conoidal form thereby providing a V-section recess between this surface and the strips 39. One portion of the conductor 42 is arranged to lie in the recess, as shown in the lower parts of Figures 10 and 11, where, by virtue of its own tension, it presses firmly against the strips 39 and so connects them together.

Spaced from the end plate 41 by spacers 44 carried on through-bolts 45 is another end plate 46. Secured to this end plate is an annular member 47 similar to the annular member 43.

Extending through the centre of the instrument is a rotatable adjusting spindle 48 to which is clamped a sleeve member 49. This sleeve member 49 carries a central flange 50 which is rotatable with the spindle 48 and which projects well beyond the periphery of the annular members 43 and 47. In the part of the flange 50 projecting beyond these members is formed an elongated hole 51. The conductor 42 passes through this hole as shown in Figures 10 and 12 so that one length of it lies in contact with the annular member 43 while the remainder lies in contact with the annular member 47. The two ends of the conductor 42 are anchored in the members 43 and 47 respectively, by means of springs 52 and anchorage pins 53. The springs 52 keep the conductor 42 taut.

By rotating the spindle 48, and with it the flange 50, the hole 51 is moved round relative to the members 43 and 47, thereby transferring a length of the conductor 42 from one side of the flange 50 to the other and thereby altering the length of the conductor 42 which lies in contact with the metal strips 39.

Preferably the inclined surfaces of the members 43 and 47 are hyperboloids generated by inclined straight lines, so that the portions of the conductor 42 which pass from the apices of the V-section grooves to the hole 51 will lie on a straight line, thereby assuring an abrupt break-away from the metal strips 39.

In the end plate 46 is formed an arcuate slot 54 in which is fitted an adjustment block provided with a locking set screw 56. The flange 50 carries a projecting stop 57 which is arranged to make contact with the block 55 on one side or the other when the flange 50 has been turned into one or other of its two extreme positions of rotation. By adjusting the position of the block 55 the initial and final capacity values of the instrument can be adjusted without altering its range of angular movement.

A trimming device is also provided for adjusting the capacity value at any given setting of the spindle 48. This comprises a flexible leaf 60 (best seen in Figure 13) which is arranged to overlie the dielectric layer 38 and overlap the two tongues 36 and 37 of the electrodes. By progressively flattening this leaf against the surface of the dielectric layer 38 the capacity value of the part of the dielectric and electrode assembly comprising the tongues 36 and 37 can be adjusted. The bending of the leaf 60 is controlled by anchoring its inner end to the end plate 41 by means of a tab 61, and by forming behind the leaf a box 62 of rectangular cross-section. The axis of the box is inclined to the length of the leaf 60 and it contains a block 63 having inclined sides. A screw 64 screws into the end plate 41 and adjusts the radial position of the block 63, thereby determining the degree of flattening of the leaf 60. The screw 64 passes through a slot 65 formed in the portion of metal which connects the leaf 60 to the box 62.

The whole capacitor assembly may be enclosed in a dust-proof insulating cover (not shown).

Two or more similar capacitor units may be ganged together and operated from a common adjusting spindle 48.

If desired, epicyclic reduction gearing may be provided between the adjusting spindle 48 and the sleeve 49 to increase the sensitivity of the adjustment. For instance, a compound epicyclic gear train may be used as shown in Figure 14 which has duplex planet wheels of different diameters, the larger diameter planet wheels 66 being arranged to engage a sun gear 67 on the adjusting spindle 48 while smaller planet wheels 68 coaxial with the larger planet wheels and connected thereto are arranged to engage an internal ring gear 69 in the stationary end plate 41. The planet wheels are freely mounted in apertures formed in a hollow cylindrical planet carrier 70 which also carries the flange 50. Conveniently there are three sets of planet wheels disposed equidistantly around the spindle 48. Such a compound gear train can be designed to provide a speed reduction of, say, 5 to 1, as opposed to a maximum speed reduction of about 4 to 1 obtainable with a simple epicyclic train of the same overall dimensions. Greater speed reductions can be obtained, if desired, by providing two epicyclic gear trains in series.

It is not essential to employ properly cut gear teeth on all the parts. For example, knurled axial serrations may be provided externally on the adjusting spindle 48 to serve as the sun gear 67, and internally in the recess of the end wall 41 which serves as the ring gear 69, the planet wheels 66 and 68 comprising hard rubber cylinders which make good frictional contact with the said serrations under the relatively light loads imposed.

Numerous modifications may be made to the arrangements described without departing from the invention. For example, the advantages of arrays of conductive strips forming part of the conductive bridge can be made use of in embodiments in which a single element, in the form of a composite band, is wound upon itself in a spiral coil to vary the capacity value. Such an arrangement is shown in Figure 15. In this arrangement the two electrodes 10 and 11 are embedded in a flexible band of dielectric material 12A so that there is dielectric on both sides of the electrodes. On the surface of the dielectric are arrays of metal strips 71 and 72, each strip being folded over the edge of the dielectric so as to extend across both the back and front surfaces of the dielectric. The strips 71 embrace the electrode 10 but are spaced therefrom on both sides by dielectric material, while the strips 72 similarly embrace the electrode 11. The strips are disposed obliquely in relation to the length of the band, and the end strips 71A and 72A are connected together at 73. When the band is flat, only a very small part of the electrodes will be bridged, namely, the parts covered by the connected strips 71A and 72A. If the band is wound upon itself, however, the front portions of the strips from the array 71 will cross and make contact with the back portions of the strips from the same array in the adjacent turn. Thus, in the wound portion of the band, all the strips 71 will be connected together. Similarly, in the wound portion of the band all the strips 72 will be connected together. Since these strips are joined by the bridge 73 the whole area of the electrodes in the wound portion of the band will be effective, but in the unwound portion of the band the electrodes will remain ineffective. Thus the capacity value can be varied by winding on more or less of the band. Intermediate connections between the arrays of strips may be made at intervals along the band if desired.

What we claim as our invention and desire to secure by Letters Patent is:

1. A variable capacitor comprising a dielectric support means having two parallel sides, two separate electrodes disposed spaced apart upon one of said sides of the dielectric means, a first array of spaced electrode strips disposed upon the other of said sides of the dielectric means opposite to one of said electrodes for capacitive coaction therewith, a second array of spaced electrode strips also disposed upon said other side opposite to the other electrode for capacitive coaction therewith, and movable conductive bridge means for interconnecting a selected number of strips of both arrays.

2. A variable capicitor as calmed in claim 1 in which said two electrodes have projecting fingers, the fingers from one electrode lying between but spaced from the fingers projecting from the other electrode, and said arrays of strips of the conductive bridge means comprise alternate members of a row of strips on said dielectric means opposite to said electrode fingers.

3. A variable capacitor as claimed in claim 1 in which said bridge means comprise a flexible conductor and a movable member, said movable member cooperating with and being movable relatively to the flexible conductor for guiding said flexible conductor progressively into contact with successive strips of both arrays when moved in one direction, and for guiding said flexible conductor out of contact with said strips when moved in the opposite direction, whereby movement of the said movable member varies the number of interconnected strips of both arrays.

4. A variable capacitor as claimed in claim 3 in which said flexible conductor consists of at least one convoluted strand of wire and is elastic in the longitudinal direction.

5. A variable capacitor as claimed in claim 3 in which said arrays of strips are arranged transversely along a circular arc and said movable member is movable on a circular path to sweep over said arc, and which includes a circular guide to hold in place the length of said flexible conductor which has been guided in contact with said strips.

6. A variable capacitor as claimed in claim 5 which includes an adjustable stop for adjusting the limits of the range of movement of said movable member while maintaining the angular extent of said range.

7. A variable capacitor as claimed in claim 1 in which said electrodes and dielectric have extensions which constitute the electrodes and dielectric of an adjustable trimmer capacitor.

8. A variable capacitor as claimed in claim 1 in which said bridge means comprise a flexible conductor and a rotatable member, said rotatable member cooperating with and being rotatable relative to the flexible conductor for guiding said flexible conductor progressively into contact with successive strips of both arrays when moved in one direction and for guiding said flexible conductor out of contact with said strips when moved into the opposite direction whereby movement of said rotatable member varies the number of interconnected strips of both arrays, and in which said bridge means further include adjustment means for said rotatable member, said adjustment means including a rotatable adjusting spindle, and epicyclic reduction gearing between said spindle and said rotatable member said gearing comprising a sun wheel on said spindle, a relatively large planet wheel engaging said sun wheel, a smaller planet wheel connected for rotation with said larger planet wheel, a stationary ring gear engaged by said smaller planet wheel, and a planet-carrier connected to said rotatable member.

9. A variable capacitor as claimed in claim 8 in which said sun wheel and said ring gear have roughened working surfaces and said planet wheels have smooth working surfaces of a firm resilient material, to provide good frictional engagement with said sun wheel and said ring gear.

References Cited in the file of this patent

UNITED STATES PATENTS

| | | |
|---|---|---|
| 1,551,661 | Hill | Sept. 1, 1925 |
| 1,623,741 | McDonald | Apr. 5, 1927 |
| 1,756,512 | Dubilier | Apr. 29, 1930 |
| 2,081,914 | Dow | June 1, 1937 |
| 2,541,749 | De Lange | Feb. 13, 1951 |
| 2,556,453 | Sperry | June 12, 1951 |
| 2,567,280 | Foster | Sept. 11, 1951 |
| 2,581,966 | Mitchell | Jan. 8, 1952 |
| 2,591,705 | Kodama | Apr. 8, 1952 |

FOREIGN PATENTS

| | | |
|---|---|---|
| 258,331 | Great Britain | Sept. 16, 1926 |
| 624,457 | Germany | Jan. 21, 1936 |
| 641,177 | Germany | Jan. 28, 1937 |